R. T. WILDER.
FILTERING MACHINE.
APPLICATION FILED JUNE 16, 1908.
925,856.
Patented June 22, 1909.
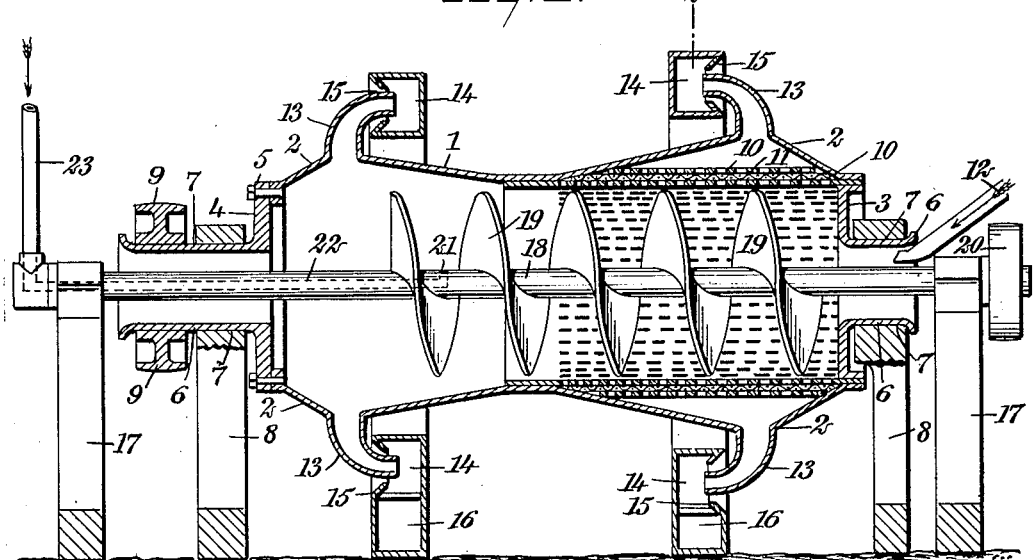
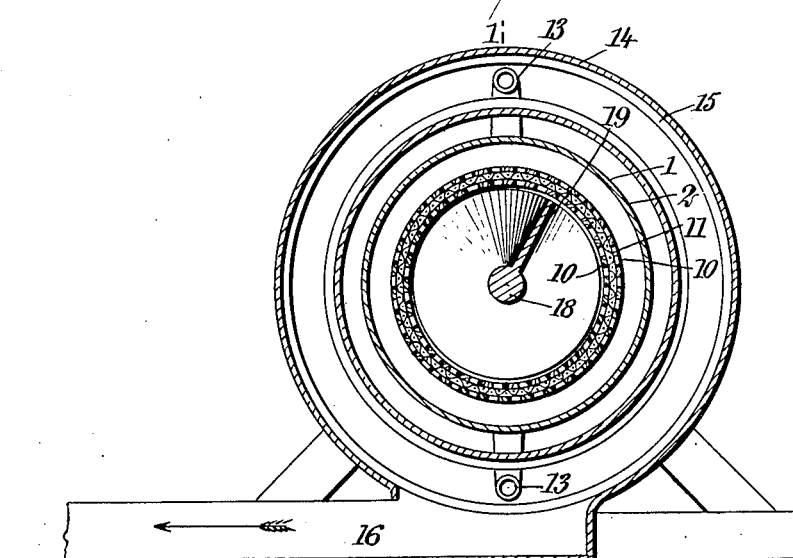
WITNESSES
INVENTOR
Richardson T. Wilder
BY
ATTORNEYS

UNITED STATES PATENT OFFICE.

RICHARDSON TIMOTHY WILDER, OF EL PASO, TEXAS.

FILTERING-MACHINE.

No. 925,856.     Specification of Letters Patent.     Patented June 22, 1909.

Application filed June 16, 1908. Serial No. 438,702.

*To all whom it may concern:*

Be it known that I, RICHARDSON T. WILDER, a citizen of the United States, and a resident of El Paso, in the county of El Paso and State of Texas, have invented a new and Improved Filtering-Machine, of which the following is a full, clear, and exact description.

This invention relates to filtering machines, and more particularly such as operate centrifugally to force the substance to be filtered through the filtering media.

The object of this invention is to provide a filtering machine having a rotatable casing and a helical screw adapted to centrifugally separate the solid matter from the liquids in which it is held in mechanical suspension.

A further object of the invention is to provide a device of the class described, having a rotatable casing, in one end of which perforated cylinders are arranged and into which the solution carrying the solid matter in suspension flows, and a helical screw adapted, like the casing, to be rotated at a high rate of speed so that the solution within the cylinders will be acted upon centrifugally, and the solid matter and the liquid separated one from another as the liquid is forced through the filtering media.

The invention consists in the construction and combination of parts to be more fully described hereinafter and particularly set forth in the claims.

Reference is to be had to the accompanying drawings forming a part of this specification, in which similar characters of reference indicate corresponding parts in both views.

Figure 1 is a longitudinal section on the line 1—1 of Fig. 2; and Fig. 2 is a cross section on the line 2—2 of Fig. 1.

Before proceeding to a more detailed description of my invention, it should be understood that I provide a filtering machine, especially adapted to be used in connection with the cyanid process of gold extraction. As before mentioned, the device includes a suitably formed, rotatable casing. Near one end of the casing there are two perforated cylinders, one arranged within the other, and having a suitable filtering fabric located therebetween. Adjacent to these cylinders is an opening into which a spout extends for carrying the liquid to be filtered. Revolubly mounted within the casing and having a helical screw arranged thereupon, is a shaft. When rotated at a high rate of speed, the casing and the screw centrifugally act upon the liquid and the solution is forced through the perforated cylinders and out of the discharge nozzles located adjacent thereto. The solid matter is carried beyond the perforated cylinders in the casing and escapes through discharge nozzles at the further end of the casing. The end of the shaft which lies in this portion of the casing is hollow and has an opening within the casing, forming a conduit, so that a stream of water may be passed therethrough to assist in washing the solid matter or residues into the discharge nozzles.

Referring more particularly to the drawings, 1 represents a casing, which is constricted at its center so that outwardly disposed, doubly tapered portions 2 are formed. The casing has heads 3 and 4 respectively, the latter being removably held in place by means of bolts 5. These heads have hollow journals 6 integral therewith and located in bearings 7 of suitable supports or standards 8. Rigid with the journal 6 of the removable head 4 of the casing, and positioned beyond the standard 8 is a driving pulley 9, whereby the casing may be rotated. Arranged within the casing, at the opposite end to that which carries the removable head 4 are two perforated cylinders 10, having a strip of filtering fabric 11, such as canvas or the like, separating one from the other. These cylinders are rigidly arranged within the casing so that they rotate therewith. A spout 12 for introducing the solution or other liquid to be filtered, has one end located in the hollow journal 6 adjacent to the cylinder. The outwardly disposed portions 2 of the casing have opposite pairs of discharge nozzles 13 at their apexes. These nozzles empty into annular troughs 14; the latter having flanges 15 adjacent to the nozzles so that the material discharged will not be spilled. These troughs in turn open into pipes 16 located under the machine, for carrying away the material delivered from the nozzles.

Revolubly journaled on supports 17 and extending through the center of the casing is a shaft 18, on which is mounted a helical blade or screw 19. A driving pulley 20 is rigidly secured to the shaft at the point where it extends beyond one of the standards 17. The opposite end of the shaft from that which carries the driving pulley is hollow and has an opening 21 discharging from the hollow part 22 into the interior of the casing. A feed pipe 23 has a movable connection at the end of the shaft with the opening 22 so that a stream of liquid may be forced into the interior of the casing.

From the description above set forth, it will be understood that the device comprises a rotatable casing adapted to be driven at a high rate of speed, together with an independently rotatable screw, the rate of speed at which said screw is rotated determining the rate of discharge of the filtered material. As the casing 1 is rotated at a high rate of speed the slimes fed thereto by the spout 12 are freed of their liquid contents under the centrifugal action of the device, said liquid passing through the perforated portions 10 and filtering medium 11 into the chamber 2, from which it is discharged through the nozzles 13 into the trough 14 and pipe 16 at the right hand end of the machine. The residue is carried beyond the perforated cylinders in the casing by means of the screw 19, and a stream of water is introduced through the feed pipe 23, passage 22 and discharge opening 21 which aids in the discharge of said filtered material through the nozzles in the left hand end of the casing 1 into the trough 14 and pipe 16 communicating therewith.

Having thus described my invention, I claim at new and desire to secure by Letters Patent:—

1. A filtering machine comprising a horizontal rotatable casing perforated through a portion of its length, a filtering medium secured to coöperate with said perforated portion, an annular chamber surrounding said perforated portion and provided with nozzles discharging substantially parallel to the axis of said casing, an annular trough open at one side to receive the ends of said nozzles, and an independently rotatable screw for moving the residue longitudinally through said casing.

2. A filtering machine comprising a horizontal rotatable casing, perforated throughout a portion of its length, a filtering medium secured to coöperate with said perforated portion, an annular chamber surrounding said perforated portion and provided with nozzles discharging substantially parallel to the axis of said casing, an annular trough open at one side to receive the ends of said nozzles, a shaft extending longitudinally through said casing and provided with a passage for conveying a liquid into the non-perforated portion of said casing, a feed screw mounted on said shaft, and means for discharging the liquid and material fed by said screw.

3. A filtering machine, comprising a rotatable casing, perforated for a portion only of its length and having means whereby material may be received from the outside, a filtering medium supported to coöperate with said perforated portion, the rotation of said casing operating centrifugally to expel the liquid contents of the material through said filtering medium, an annular chamber surrounding the perforated portion of said casing and provided with horizontal discharging nozzles, a feed screw extending longitudinally through said casing and mounted upon a horizontal shaft, an enlarged non-perforated portion of said cylinder provided with discharge nozzles, and means for conveying a liquid through said non-perforated portion of the cylinder to mix with the residue as it is fed by said screw to facilitate its discharge through said nozzles.

4. A filtering machine, comprising a horizontal rotatable casing having a perforated and a non-perforated portion, a filtering medium secured to coöperate with said perforated portion, an annular chamber surrounding said perforated portion and having discharge nozzles, said chamber rotating with said casing, a shaft extending longitudinally through said casing and provided with a passage for conveying a liquid into the non-perforated portion of said casing, a feed screw mounted on said shaft, and means for discharging the liquid and material fed by said screw.

5. A filtering machine, comprising a horizontal rotatable casing having a perforated and a non-perforated portion, a filtering medium secured to coöperate with said perforated portion, means for feeding slimes to said casing, the liquid contents of which are centrifugally expelled through said filtering medium, means for receiving and discharging the liquid expelled through said filtering medium, a shaft extending longitudinally through said casing and having a passage for conveying the liquid to the non-perforated portion of said casing, a feed screw on said shaft to feed the residues from said slimes to the non-perforated portion of said casing where they may commingle with the liquid supplied through said shaft, and means for discharging said liquid and residues.

In testimony whereof I have signed my name to this specification in the presence of two subscribing witnesses.

RICHARDSON TIMOTHY WILDER.

Witnesses:
GEO. FERGUSON,
J. W. KRAFT.